July 6, 1926.
J. BLASCHKE
PNEUMATIC TIRE WHEEL.
Filed Feb. 20, 1926
1,591,413
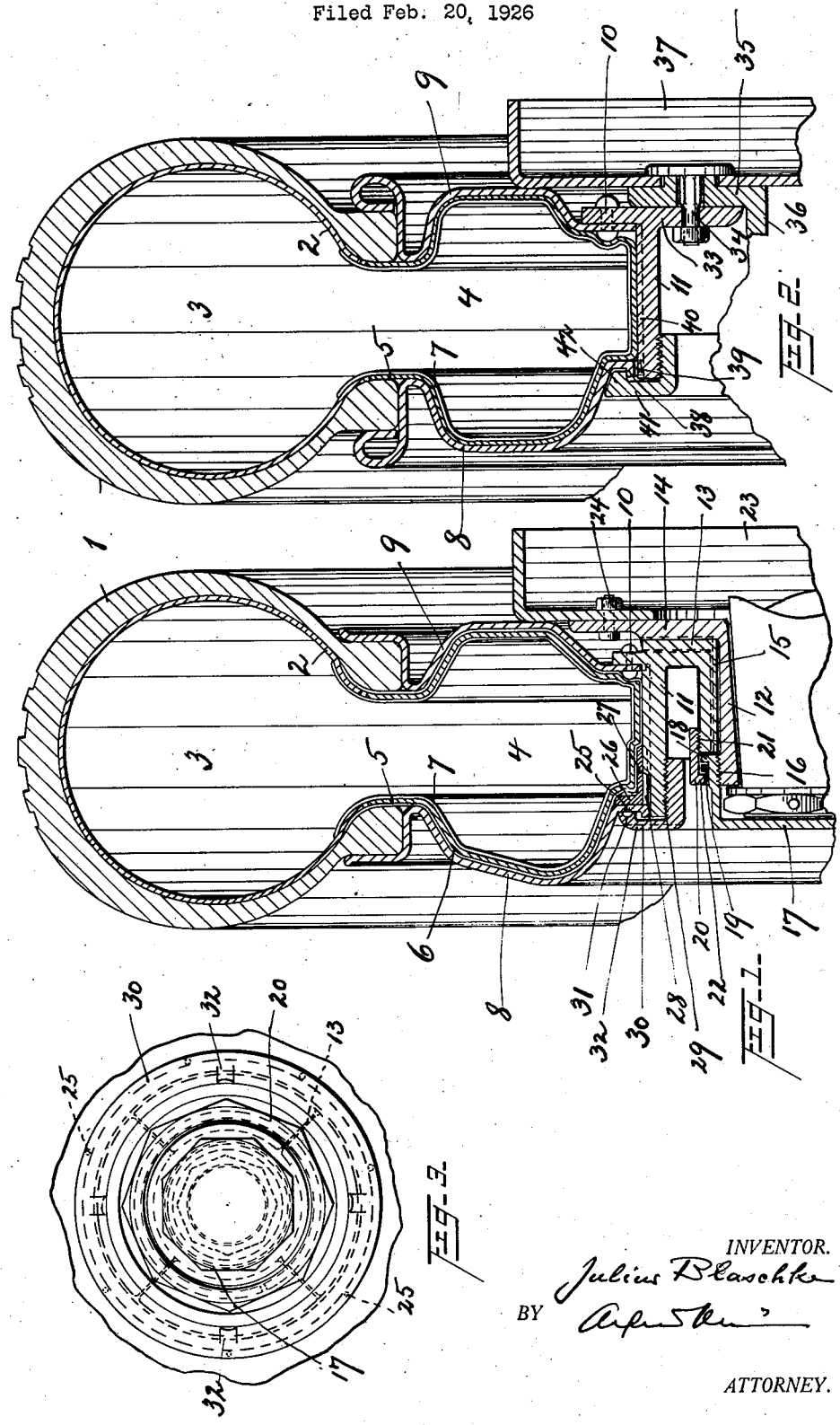

Patented July 6, 1926.

1,591,413

UNITED STATES PATENT OFFICE.

JULIUS BLASCHKE, OF BROOKLYN, NEW YORK.

PNEUMATIC-TIRE WHEEL.

Application filed February 20, 1926. Serial No. 89,638.

My invention relates to pneumatic tire wheels and more particularly to that type of wheel in which the part carrying the inflatable tire can be detached from the hub of the wheel as a whole. The object of my present invention is to improve the means for fastening said part on the hub and holding it there securely in place while at the same time permitting its ready and easy detachment from the hub, in case a change of tire is required.

For a better understanding of my invention, I refer to the appended drawing, in which I have illustrated my invention, by way of example, in two different embodiments, Fig. 1 being a sectional view through one embodiment, Fig. 2 a modification and Fig. 3 an end view of the hub portion.

In the drawing, 1 designates the outer tire-shoe and 2 the inner tube which, as shown in Figs. 1 and 2, when inflated forms an outer air chamber 3 and an inner air chamber 4. To strengthen that part of the inner tube held within the rim of the wheel, I provide a lining 5 of canvas, or other suitable material, whereas at 6 and 7 are indicated thin layers of rubber which are vulcanized both to the lining 5 and the inner tube 2. In Fig. 2 only one layer 7 of vulcanized rubber is shown.

The wheel rim adapted to receive the tire is made of two parts, viz the outer part 8 and the inner part 9. The latter is fastened, preferably by rivets, one of which is shown at 10 to an annular support 11, which in the embodiment according to Fig. 1 is almost U-shaped in cross-section and is mounted on the hub 12. The rear wall of the support 11 is formed with two or more radial projections 13 adapted to engage corresponding recesses in the perpendicular portion 14 of the hub 12. In a similar manner, the shorter wall of support 11 is provided at two or more places with projecting ribs 15 adapted to enter corresponding recesses in the hub, or vice versa, projecting ribs may be provided on the hub to enter recesses in the opposite wall of support 11. Thus, the annular support 11 is prevented from any relative circumferential movement in respect of the hub.

The free end of the latter is screw-threaded at 16, and onto this screw-threaded end is screwed a large screw-cap 17, whereby the said rim-support 11 is securely held in place on the hub. At the inner end of the screw-cap 17 is provided a flange 18, against which bears a divided ring 19, which is slightly twisted to exert a certain pressure. A safety-ring 20 is provided having an inner screw-thread adapted to engage a screw-thread provided at the extreme end of the shorter annular wall of the rim-support 11 as shown at 21 in Fig. 1. A flange 22 on said safety-ring 20 bears against the divided ring 19. The safety ring 20 and the screw-cap 17 have opposite screw-threads so that any tendency of one of these elements to become accidently unscrewed will be counter-acted by the other element. By means of its perpendicular portion 14 the hub is secured to the brake-drum shown at 23, screw bolts 24, or other suitable fastening means being employed.

The outer rim-part 8 is secured by rivets, indicated at 25, or otherwise to the flange 26 of an annular member 27, which is of rectangular cross-section and is provided with radially projecting ribs 28 adapted to engage corresponding recesses in the outer wall of rim-support 11, so that any relative circumferential movement between the said member 27 and the rim-support 11 is prevented. Near its outer end, on the inside of the outer wall, the rim-support 11 is provided with screw-threads shown at 29 which are engaged by a screw-threaded large ring 30 of L-shaped cross-section, which ring, with its perpendicular limb bears against the outer rim-part 8 thereby holding it in position on rim-support 11. In the inwardly turned end of the perpendicular limb of ring 30 are provided shallow cavities, one being shown at 31 to receive the heads of the screws or rivets 25 holding the outer rim part 8 to the annular member 27. In the outer face of the perpendicular limb of the ring 30 are provided at two or more places cuts or cavities one being shown in Fig. 1 at 32, to permit a wrench or other tool to be inserted.

In the modification shown in Fig. 2, the rim-support 11 is T-shaped in cross-section, the perpendicular portion 33 of the support being secured by screw bolts, one being indicated at 34, or other suitable fastening means to the perpendicular portion 35 of the hub 36, which by the same screw bolts 34 is secured to the brake-drum 37. In this embodiment, there are provided in the inner circumferential flange 38 of the outer rim-portion 8 wedge-shaped recesses as indicated at 39, into which recesses project correspondingly shaped ribs 40 provided on the horizontal limb of the rim-support 11. The ring 41 corresponding to ring 30 shown in Fig. 1, and also screwed onto the outer screw-threaded end of the rim-support 11 is in this case provided with an inwardly projecting annular flange 42 which enters a corresponding cavity provided on the inner circumferential portion of the outer rim-part 8, as clearly shown in Fig. 2. In this manner, the outer-rim part 8 is held very securely in place and is insured against becoming accidentally dislodged.

Where the rim-parts are made of cast-iron, or other cast-metal, the inner rim-part 9 can be made integral with the rim-support 11, and also the outer rim-part 8 and the annular member 27 shown in Fig. 1 could be made of one piece.

From the foregoing detailed description of my invention it will be obvious to any one, without any further explanation, how the wheel is assembled or taken apart.

I claim as my invention.

1. In a pneumatic tire wheel, the combination with the hub, and a wheel-rim comprising an inner and outer part, of a U-shaped rim-support, means for holding said rim-support in place on said hub, said rim-support having thereto secured said inner rim-part, and detachable means cooperating with said rim-support for detachably holding in place thereon said outer rim-part.

2. In a pneumatic tire wheel, the combination with the hub and a wheel-rim comprising an inner and outer rim part, of a rim-support, means for holding said rim-support in place on said hub, said rim-support having thereto secured said inner rim-part, a screw-threaded ring engaging corresponding screw-threads on said rim-support for detachably holding said outer rim-part in place thereon, and a means for preventing relative circumferential movement between said outer rim-part and said rim-support.

3. In a pneumatic tire wheel, the combination with the hub and a wheel-rim comprising an inner and outer rim-part, of a rim-support, means for holding the latter in place on said hub, said rim-support having thereto secured said inner rim-part, a screw-threaded ring engaging corresponding screw-threads on said rim-support for detachably holding said outer rim-part in place thereon, and an annular member secured to said outer rim-part and provided with ribs engaging corresponding recesses in said rim-support for preventing relative circumferential movement between said rim-support and said outer rim-part.

4. In a pneumatic tire wheel, the combination with the hub and a wheel-rim comprising an inner and outer rim-part, of a rim-support mounted on said hub, a screw-cap engaging the threaded end of said hub and bearing against said rim-support for holding it in place on said hub, said rim support having thereto attached said inner rim-part, a screw-threaded ring, a corresponding screw-thread on said rim-support for detachably holding said outer rim-part in place on said rim-support, and a means cooperating with said rim-support for preventing relative circumferential movement between said outer rim-part and said rim-support.

In testimony whereof I affix my signature.

JULIUS BLASCHKE.